(12) United States Patent
Janot et al.

(10) Patent No.: US 6,309,682 B1
(45) Date of Patent: Oct. 30, 2001

(54) DRY LAMELLAR-STRUCTURE PET FOOD PRODUCT

(75) Inventors: Denis Janot, Fouilloy; Thierry Martin, Amiens; Marco Toppano, Lagny sur Marne, all of (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/495,039

(22) Filed: Jan. 31, 2000

Related U.S. Application Data

(63) Continuation of application No. 08/665,855, filed on Jun. 19, 1996, now Pat. No. 6,086,939.

(30) Foreign Application Priority Data

Jun. 20, 1995 (EP) .................................... 95201666

(51) Int. Cl.$^7$ ................ A23K 1/14; A23L 1/20; A23L 1/314; A23J 3/04; A23J 3/14

(52) U.S. Cl. ................ 426/92; 426/93; 426/104; 426/623; 426/630; 426/635; 426/805

(58) Field of Search .................... 1p;1p426/623, 426/ 630, 635, 516, 517, 104, 805, 92, 93

(56) References Cited

U.S. PATENT DOCUMENTS

| | | | |
|---|---|---|---|
| 3,488,770 | 1/1970 | Atkinson | 426/104 |
| 3,793,466 | 2/1974 | Hawkins et al. | 426/274 |
| 3,903,315 | 9/1975 | Giles et al. | 426/388 |
| 3,940,495 | 2/1976 | Flier | 426/104 |
| 3,946,123 | 3/1976 | Hanna | 426/643 |
| 3,950,564 | 4/1976 | Puski et al. | 426/516 |
| 4,042,715 | 8/1977 | Wenger et al. | 426/104 |
| 4,371,556 | 2/1983 | Pitchon et al. | 426/311 |
| 4,371,562 | 2/1983 | Friedman et al. | 426/656 |
| 4,418,086 | 11/1983 | Marino et al. | 426/302 |
| 5,097,017 | 3/1992 | Konwinski | 530/378 |
| 5,242,292 | 9/1993 | Wenger | 425/308 |
| 5,565,234 | 10/1996 | Teraguchi et al. | 426/634 |

FOREIGN PATENT DOCUMENTS

| | | |
|---|---|---|
| 0265740 | 5/1988 | (EP) . |
| 2274235 | 1/1976 | (FR) . |
| 1433976 | 4/1976 | (GB) . |
| 61-224941 | 6/1986 | (JP) . |

OTHER PUBLICATIONS

Partial Translation of Taguchi, et al., Japanese Patent Document No. JP–A–61 224 941 (1986).

Patent Abstracts of Japan, vol. 11 No. 63 (C–406), Abstract of Taguchi, et al., Japanese Patent Document No. JP–A–61 224 941 (Application No. 850065305) (1987).

*Primary Examiner*—Arthur L. Corbin
(74) *Attorney, Agent, or Firm*—Winston & Strawn

(57) ABSTRACT

A food composition, particularly for pets, is prepared by adding and mixing cereal, vegetable protein, animal meal, vegetable by-products and lipid ingredients together and extrusion-cooking the mixture and then passing the extrusion-cooked mixture via a cone member and then a die member to obtain, from the die member, a product wherein a plurality of extrudate band layers form a lamellar structure, after which the lamellar-structure product is cut into pieces to obtain pieces which have a band layer lamellar structure, and then, the pieces are dried. The ingredients are employed and the process is carried out so that the dried product has a protein content of between 14% and 35%, a lipid content of between 2% and 20%, a carbohydrate content of at least 25%, a moisture content of between 2% and 15% and a density of between 0.3 and 0.6 g/cc.

14 Claims, 2 Drawing Sheets

Figure 3:
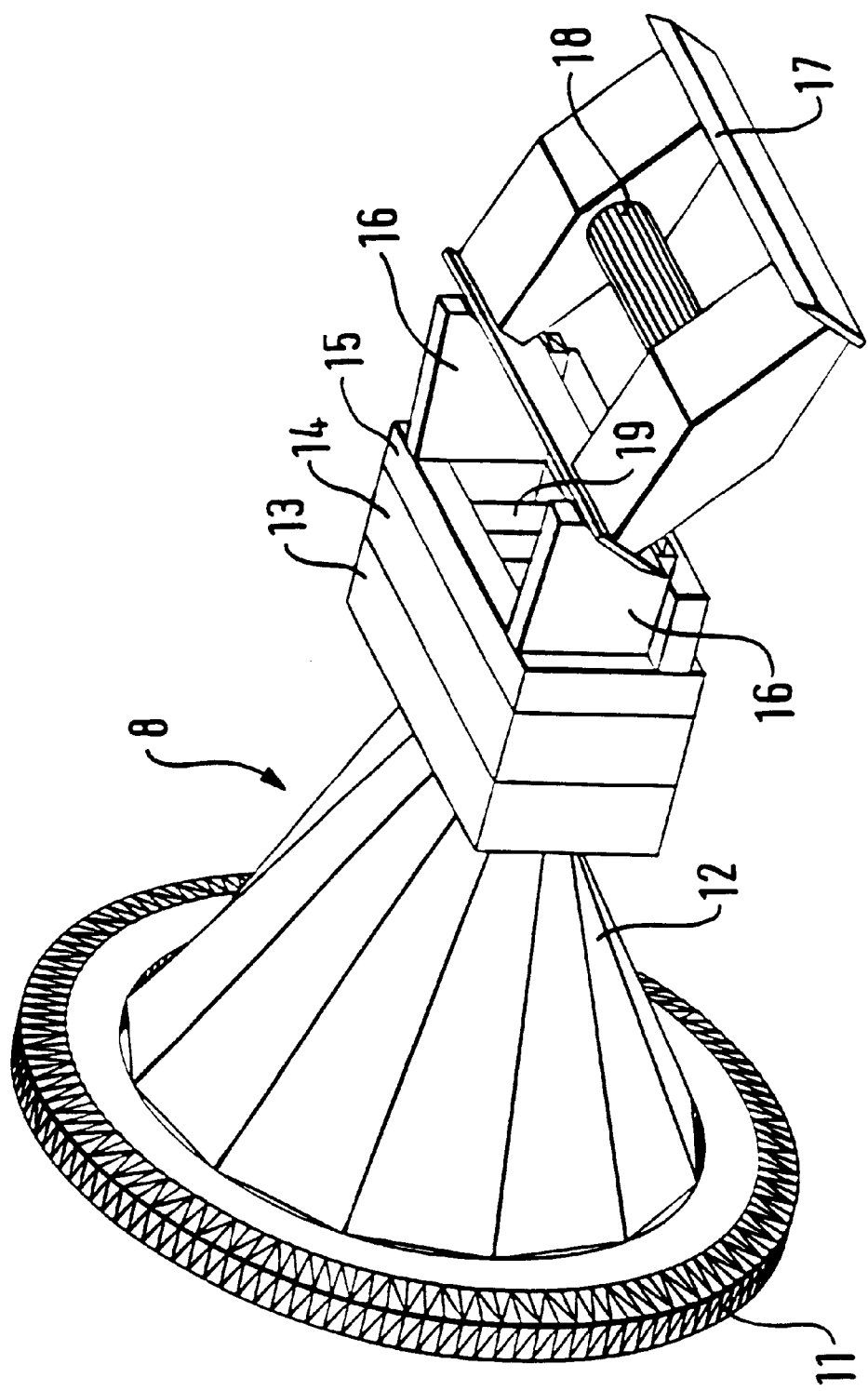

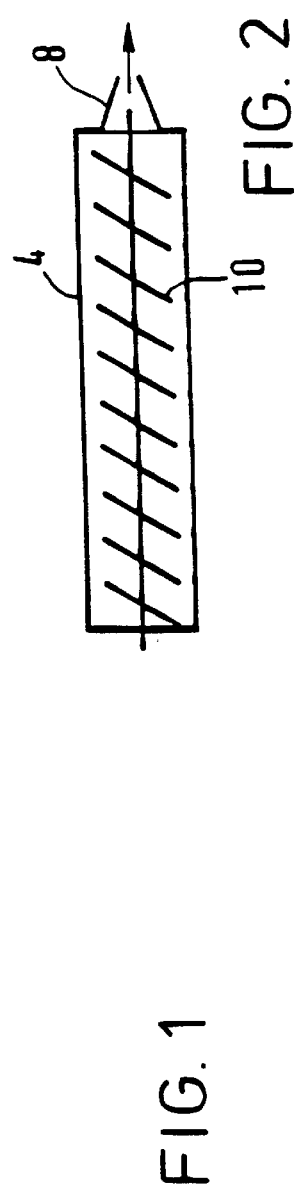
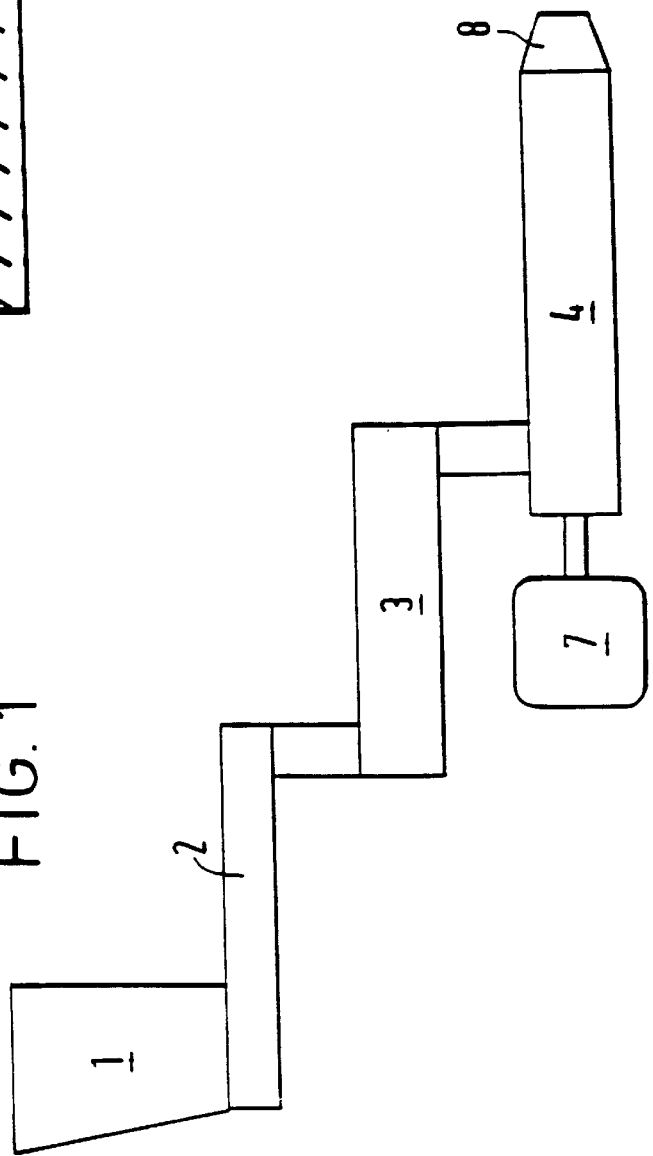
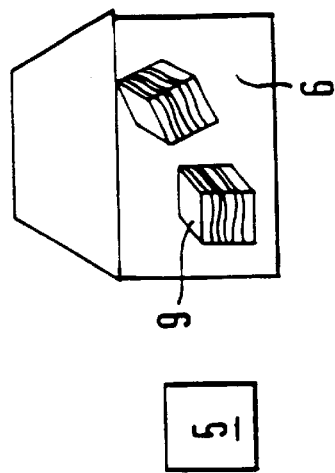

DRY LAMELLAR-STRUCTURE PET FOOD PRODUCT

CROSS-REFERENCE TO RELATED APPLICATION

This application is a continuation application of application Ser. No. 08/665,855 which was filed Jun. 19, 1996, now U.S. Pat. No. 6,086,939.

BACKGROUND OF THE INVENTION

The present invention relates to food compositions, particularly to food compositions for pets and more particularly, to dry pet foods, and to the structure and texture of the food compositions, particularly structure and texture imparted by extrusion-cooking procedures and the manner in which the extrusion-cooked food is manipulated during and after extrusion from an extrusion device which includes one or more screws.

Traditionally, dry pet foods are produced by extrusion (croquettes). These products are expanded and do not resemble meat. Other extrusion and spinning techniques are well known and used in the art. The products thus obtained are indeed moisture-containing or dried meat analogues, but these technologies require formulas with high protein levels in order to texture the material (levels greater than 40%).

French Patent Application Publication No. 2,274,235 relates to a dry food having a tender and soft texture and appearance and comprising a mixture of fatty substances, proteinaceous binders and a plasticizing agent while limiting the starchy ingredients to 25%, but the texture is not lamellar and crunchy and the formulas are specific. Japanese Patent Document Publication No. 61-224941 relates to textured products, of high densities, with protein levels greater than 40%, manufactured solely in twin-screw extruders.

SUMMARY OF THE INVENTION

The aim of the present invention is to develop a dried meat analogue from a traditional formula for pets, that is to say containing less than 40% protein, requiring no addition of proteinaceous binders, plasticizing agent or sugars and having a crunchy texture.

The invention relates to a dry pet food obtained from an extruder. The extruder which will be described more precisely below is a system with one or two screws of variable or constant pitch housed in a barrel which works under pressure and at high temperature.

The invention provides a dry pet food which, by weight, has a lamellar structure which has a moisture content of between 2 and 15%, a protein content of between 14 and 35%, a carbohydrate content of at least 25% and a lipid content of between 2 and 20% and which has a density of between 0.3 and 0.6 g/cc.

The lamellar structure is in the form of layers each having a thickness of between 1 and 6 mm. The carbohydrate content is between 25 and 70%.

The invention also provides a process for producing the dry food composition described above, in which the basic ingredients, as mentioned above, are mixed, the mixture is cooked in an extruder or expander, the product is discharged from the extruder or expander in the form of a band, or strip, having layers which is cut to the desired size into pieces, and the pieces are dried to obtain a moisture content of between 4 and 15%. After mixing the basic ingredients, preconditioning may be carried out to obtain a moisture content of between 13 and 25%.

DETAILED DESCRIPTION OF THE INVENTION

The product according to the invention is obtained by a conventional mixing of cereals, vegetable protein extracts, animal meals and vegetable by-products. Normally, the cereal content is between 40 and 70%, that of vegetable proteins between 5 and 25%, that of animal meals between 5 and 30% and that of vegetable by-products between 10 and 20%. Cereals are understood to mean any species of cereals regardless of their presentation or the products obtained by processing the farinaceous kernel of the cereals. Vegetable protein extracts are understood to mean any product of plant origin, whose proteins have been concentrated by an appropriate treatment, which contain at least 50% crude protein relative to the dry matter and which may have been restructured. Animal meals are understood to mean any product and by-product obtained from the processing of animals or animal parts.

Vegetable by-products are understood to mean by-products obtained from the treatment of plant products, in particular cereals, vegetables, leguminous plants and oil seeds.

It has been observed that the palatability of the product according to the invention is equivalent to, or even better than that of the dry foods obtained conventionally, that is to say by cooking-extrusion.

The dry food is intended both for cats and for dogs. Preferably, this food is intended for dogs. It contains between 18 and 35% protein, or between 20 and 30% and a moisture content of between 8 and 12%. It is provided in the form of pieces of lamellar texture having sizes in the three dimensions of between 5 and 40 mm. The pieces have a weight of between 0.5 and 25 g.

Before mixing the various ingredients, they are ground to the desired size. The mixture thus obtained has a moisture content of the order of 10%. The mixture is then introduced into a feed hopper comprising a metering screw used to regulate the throughput of the process.

The mixture supplied by the metering screw is then optionally preconditioned with water and steam. The preconditioner is a chamber equipped with one or more axles with blades. The objective of the preconditioner is to moisten the mixture initially by about 10% in order to obtain a moisture content of between 13 and 25% or from 13% to 20%. Another objective of the preconditioner is to preheat the mixture by means of the energy supplied by the steam. The rotation of the axles causes intense mixing between the mixture, the water and the steam. The residence time in the preconditioner is between 20 and 200 seconds. At the outlet of the preconditioner, the mixture drops into the extruder.

The cooking is carried out in the said extruder. The extruder comprises one or two screws housed in a barrel. The screw(s) are rotated by a motor. The configuration of the screw is variable or constant and depends on the desired result. At the inlet of the extruder, the screw pitch is quite large in order to allow good supply of the said extruder, then the pitch becomes smaller in order to create the frictions necessary for the mixing and shearing of the mixture. The screw may consist of a single or double thread depending on the filling rate and the desired frictions. It is also possible to envisage injecting steam into the extruder, so as to speed up the cooking of the mixture. The mixture becomes pasty and it is conveyed towards the outlet of the extruder so as to be shaped.

The outlet of the extruder comprises a die, whose dimensions and shapes will allow the pasty mixture to take the shape and the appearance characteristic of the product, according to the invention. To allow the product to be shaped, an annular or flat die is actuated by hydraulic means. An adjustable opening makes it possible to create a pressure of 10 to 50 bar required to shape the product. At the level of this die, the temperature of the pasty mixture is about 80 to 140° C. It is also possible to envisage the use of a die without adjustable opening, that is to say with a fixed opening. In this case, the thickness of the product band or bands leaving the die outlet is determined by the geometry of the die. The moisture content of the product at the outlet of the extruder is about 12 to 20%. At the outlet of the die, the product bands already have the appearance of dried meat.

The extruder used is preferably a single-screw extruder, but it can be replaced by a twin-screw extruder or an expander. An expander has a single archimedean screw, in general with a constant pitch and with no neck zones. The single-screw extruders have more complex screw patterns and are capable of generating more friction and pressure.

From the extruder, a band can be extracted which will then be cut in a dicer, for example of the URSCHEL type. It is also possible to extract several bands generated by fixed knives arranged inside or at the outlet of the die. These knives may be vertical and/or horizontal. These bands will then be cut by a rotating knife. These operations are designed to convert the bands of product into pieces of the desired sizes which vary from 5×5 mm to 40×40 mm.

The pieces are finally dried in order to obtain a total moisture content of 2 to 15%. This drying is designed to enhance the preservation of the product. The drying system used is traditionally of the table type. The pieces to be dried are spread on the conveyor belt by means of a suitable system which may be a vibrating belt, a spreading screw or a vibrating distributor. The belt passes through a tunnel composed of cells each having their own heating and ventilation device. The drying occurs by passage from top to bottom or from bottom to top, or a combination of both systems so as to obtain a perfectly homogeneous product.

Further, the present invention also relates to and includes apparatus for carrying out the process and for making the product described above wherein, with reference to the foregoing, the apparatus comprises an extruder and die assembly having one or two screws of a variable or constant pitch housed in an extruder barrel and having a die, or comprises an expander having a screw and a die, and wherein the apparatus further comprises a cutting device and a drying system. Additionally, the apparatus may comprise, before the extruder, a preconditioner comprising one or two axles with blades. The cutting device is either a dicer or a system of fixed vertical or horizontal knives coupled with a rotating knife or a guillotine knife.

For a dry use, the product thus manufactured may be coated with hydrolysates, fats or coatings so as to increase the palatability of the product, to give it a desired feature or colour.

For wet use, the product can be mixed with ground meat, packaged and sterilized. During the sterilization phase, the product absorbs water and maintains its lamellar structure and its meat appearance. The product can also be incorporated into semi-preserved type products, stabilized foods or refrigerated foods.

The product may be coloured with food colourings. The colourings may be introduced in the dry state into the base or injected in liquid form into the extruder.

The rest of the description is made in relation to the drawings.

BRIEF DESCRIPTION OF THE DRAWING FIGURES

FIG. 1 shows a diagrammatic representation of the device according to the invention.

FIG. 2 a diagrammatic representation of the extruder and the die.

FIG. 3 is a perspective representation of the die.

DETAILED DESCRIPTION OF THE DRAWING FIGURES

The raw materials are ground and they are mixed with the meals. With reference to FIG. 1, feed hopper (1) which supplies the metering screw (2) is then loaded; the latter determines the speed of the process. It feeds the preconditioner (3) in which the mixture is moistened, on the one hand, by adding water and, on the other hand, by injecting steam. This treatment serves, in addition, to heat the mixture. At the outlet of the preconditioner (3), the mixture drops into the extruder (4). In the latter, the cooking of the mixture is completed at a temperature of 120° C. for 10 to 45 sec. The extruder screw, driven by a motor (7), brings the paste towards the outlet die (8) and the bands leaving the said die are cut in a cutting device (5). The pieces (9) thus obtained are fed to a drying chamber (6) operating with hot air. The lamellar structure of the pieces (9) are clearly visible in the figure. These pieces are then ready, either to be packaged, or to be mixed with a base to make them a wet product.

With reference to FIG. 2, the mixture is conveyed into the expander (4) with a single screw (10) up to the die (8) with a fixed orifice having essentially the shape of a duck beak, so as to form a band having a width of between 15 and 20 cm, the said band being moved in the direction of the arrow.

FIG. 3 represents more precisely the die (8) and the cutting device (5). It comprises a die plate (11) placed at the end of the extruder, a shaping cone (12) which extends from the extruder to an exit opening, the outlet dies (13) and (14), a frame (15) carrying fixed vertical knives (19), guides (16) and rotating knives (17) revolving around the axle (18). As illustrated, the shaping cone member (12) is positioned and provides a passage from the extruder exit opening and is directly connected to die (13), and thus, the mixture cooked by the extruder is passed from the extruder via an extruder exit opening to the shaping cone member (12) and then directly to the die (13), and the shaping cone member (12), as per the FIG. 3 illustration, provides for reducing the radial cross-section area of the cooked mixture during passage from the extruder to the die. The outlet dies (13) and (14) have rectangular openings which allow good shaping of the band of product to be cut. The knives (19) make it possible to discharge strips which are then cut in the form of pieces (9) with a sufficient speed of rotation of the knives (17).

EXAMPLES

The rest of the description is made with reference to Examples.

Example 1

A composition containing the following ingredients is prepared:

| | |
|---|---|
| Cereals | 50% |
| Meats and animal by-products | 29% |
| Oils and fats | 9% |
| By-products of plant origin | 8% |
| Vitamins and minerals | 4% |

After grinding and mixing these ingredients, the operation in the metering screw (2) is carried out with a throughput of 1,600 Kg/h. In the preconditioner (3), 5% water and 3% steam are added and the mixture stays for 120 sec. The cooking is completed in the expander which operates at 135° C. and at a pressure of 18 bar.

A uniform band 15 mm thick and 200 mm wide is discharged from the expander, this band is conveyed into a dicer where, after cutting, products with a lamellar structure of dimensions 15/15/15 mm are obtained. This product is then dried and coated so as to finally obtain a moisture content of 11%, and an apparent density of 0.38 g/cc.

The finished product has the following composition:

| | |
|---|---|
| Proteins | 24% |
| Water | 11% |
| Lipids | 4% |
| Ash | 7% |
| Carbohydrates | 43% |
| Fibres | 11% |

Example 2

A composition containing the following ingredients is prepared as in Example 1:

| | |
|---|---|
| Cereals | 65% |
| By-products of plant origin | 24% |
| Meats and animal by-products | 6% |
| Oils and fats | 3% |
| Vitamins and minerals | 2% |

10% steam and 15% water are injected into the extruder operating at 120° C. so as to wet and cook the product, the paste is pushed through the die where fixed knives (horizontal and vertical) allow the manufacture of 2 layers of 12 individualized bands. These bands are then cut with a rotating knife so as to obtain cubes with a lamellar structure of dimensions 25/25/25 mm. These cubes are then dried and coated so as to obtain a product with a moisture content of 11% and a density of 0.45 g/cc.

The finished product has the following composition:

| | |
|---|---|
| Proteins | 20% |
| Water | 11% |
| Lipids | 5% |
| Ash | 5% |
| Carbohydrates | 47% |
| Fibres | 12% |

Example 3

The procedure is carried out as in Example 1, except that the products are reincorporated into packs with sauce for subsequent sterilization. The composition being

| | |
|---|---|
| Cereals | 14.0% |
| Meats and animal by-products | 8.0% |
| Oils and fats | 2.5% |
| By-products of plant origin | 2.2% |
| Vitamins and minerals | 1.1% |
| Sauce | 72.2% | so as to finally obtain a packaged product with 80% moisture and 6% protein.

What is claimed is:

1. The product of a process for preparing a food composition which comprises:

adding together ingredients comprising cereal, vegetable proteins, animal meal, vegetable by-products and a lipid and mixing the ingredients added together to obtain a mixture which comprises the lipid ingredient and, by weight, between 40% and 70% of the cereal, between 5% and 25% of the vegetable protein, between 5% and 30% of the animal meal and between 10% and 20% of the vegetable by-products and passing the mixture through an apparatus for extrusion-cooking the mixture and for extruding and obtaining a cooked product from the apparatus, wherein the apparatus comprises (i) a screw extrusion device member which is selected from the group consisting of an extruder and an expander for cooking and extruding the mixture to obtain a cooked product and which extends to an exit opening for exit of the cooked product from the screw extrusion device member and (ii) an assembly which consists essentially of (a) a cone member and (b) a die member, wherein the cone member is connected to the screw extrusion device member for receiving the cooked product from the screw extrusion device member exit opening and is configured and arranged positionally for passage of the cooked product through the cone member to a cone member exit opening for exit of the cooked product from the cone member so that upon passage through the cone member to the cone member exit opening, the radial cross-sectional area of the cooked mixture is reduced, and wherein the die member is connected directly to the cone member for receiving the cooked product directly from the cone member exit opening and is configured to discharge the cooked product so that a product which comprises a band having a plurality of distinct layers is obtained, and discharging and obtaining a formed lamellar-structure product, which comprises a plurality of distinct layers, from the die member;

cutting the lamellar-structure product discharged and obtained from the die member into pieces to obtain pieces having a band-layer lamellar structure comprising a plurality of distinct band layers;

drying the pieces to obtain a dried product having a moisture content of between 2% and 15%; and wherein the ingredients are added together in amounts so that the dried product has, by weight, a protein content between 14% and 35%, a lipid content of between 2% and 20% and a carbohydrate content of at least 25% and wherein the ingredients added together and mixed and the cooked mixture and the lamellar-structure product do not comprise an added plasticizer ingredient and wherein the dried product has a density of between 0.3 g/cc 1 and g/cc 0.6.

2. The dried product obtained according to claim 1 wherein the vegetable protein ingredient comprises a vegetable protein extract.

3. The dried product obtained according to claim 1 wherein the lipid ingredient is added in an amount of from 2.5% to 9%.

4. The dried product obtained according to claim 1 wherein the ingredients are added together so that the dried product has a protein content of between 20% and 30%.

5. The dried product obtained according to claim 2 wherein the ingredients are added together so that the dried product has a protein content of between 20% and 30%.

6. The dried product obtained according to claim 1 wherein the dried product has a moisture content of between 8% and 12%.

7. The dried product obtained according to claim 1 wherein the lamellar-structure product is cut to obtain pieces so that the pieces have a size, in each of three dimensions, of between 5 mm and 40 mm.

8. The dried product obtained according to claim 1 wherein the ingredients added together and passed through the apparatus do not include one or both of a protein binder agent and a sugar ingredient.

9. A food composition which comprises a plurality of distinct laminated layers which comprise, by weight, a protein component comprised of animal protein and of vegetable protein in an amount of between 14% and 35%, a lipid component in an amount of between 2% and 20% and a cereal carbohydrate component in an amount of at least 25%, which has a moisture content of between 4% and 15% and a density of between 0.3 g/cc and 0.6 g/cc and which does not comprise a plasticizer component.

10. A food composition according to claim 9 wherein the vegetable protein comprises a protein extract.

11. A food composition according to claim 9 wherein the protein content is between 20% and 30%.

12. A food composition according to claim 9 wherein the moisture content is between 8% and 12%.

13. A food composition according to claim 9 wherein the composition is in the form of pieces having a size in each of three dimensions, of between 5 mm and 40 mm.

14. A food composition according to claim 9 wherein the composition further does not comprise at least one or both of a protein binder agent ingredient component and a sugar ingredient component.

* * * * *